United States Patent
Kim et al.

(10) Patent No.: US 11,597,186 B2
(45) Date of Patent: Mar. 7, 2023

(54) LAMINATING FILM AND LIGHT-TRANSMITTING LAMINATE INCLUDING SAME

(71) Applicant: SKC Co., Ltd., Suwon-si (KR)

(72) Inventors: Hyejin Kim, Suwon-si (KR); Sungjin Chung, Seoul (KR); Haksoo Lee, Suwon-si (KR)

(73) Assignee: SKC CO., LTD., Suwon-si (KR)

( * ) Notice: Subject to any disclaimer, the term of this patent is extended or adjusted under 35 U.S.C. 154(b) by 0 days.

(21) Appl. No.: 17/750,607

(22) Filed: May 23, 2022

(65) Prior Publication Data

US 2022/0281209 A1    Sep. 8, 2022

Related U.S. Application Data

(63) Continuation of application No. PCT/KR2020/016236, filed on Nov. 18, 2020.

(30) Foreign Application Priority Data

Nov. 25, 2019    (KR) .................. 10-2019-0151930

(51) Int. Cl.
*B32B 17/10* (2006.01)
*B32B 27/30* (2006.01)

(52) U.S. Cl.
CPC ...... *B32B 17/10587* (2013.01); *B32B 27/306* (2013.01); *B32B 2307/412* (2013.01); *B32B 2307/538* (2013.01); *B32B 2605/006* (2013.01)

(58) Field of Classification Search
CPC .................. B32B 17/10587; B32B 17/10036
See application file for complete search history.

(56) References Cited

U.S. PATENT DOCUMENTS

| | | | |
|---|---|---|---|
| 2004/0191482 A1 | 9/2004 | Nakajima et al. | |
| 2014/0202281 A1* | 7/2014 | Peterson | F16H 57/029 |
| | | | 277/579 |
| 2017/0121475 A1* | 5/2017 | Yacovone | B32B 3/30 |

FOREIGN PATENT DOCUMENTS

| CN | 105102223 A | 11/2015 |
|---|---|---|
| CN | 108137400 A | 6/2018 |
| CN | 106164006 B | 5/2020 |
| JP | 1998-45438 A | 2/1998 |
| JP | 2002-104846 A | 4/2002 |
| JP | 2019-147703 A | 9/2010 |
| JP | 2017-178677 A | 10/2017 |
| KR | 10-2006-0110016 A | 10/2006 |
| KR | 10-2015-0140345 A | 12/2015 |
| KR | 10-2017-0066278 A | 6/2017 |
| KR | 10-2018-0061189 A | 6/2018 |

OTHER PUBLICATIONS

International Search Report dated Feb. 25, 2021, in counterpart International Application No. PCT/KR2020/016236 (3 pages in English, 4 pages in Korean).

* cited by examiner

*Primary Examiner* — Elizabeth E Mulvaney
(74) *Attorney, Agent, or Firm* — NSIP Law

(57) ABSTRACT

A film for laminating includes an embossed surface, wherein a rad value of the embossed surface is 1 to 3 μm, where the rad value is calculated by [Formula 1] below:

$$\text{rad(um)} = \frac{1000}{Spc(\text{mm}^{-1})} \quad [Formula\ 1]$$

where, in [Formula 1], Spc is an arithmetic mean of curvatures of peak vertex on the embossed surface, which is evaluated by ISO_25178, wherein a number of peaks per 1 mm² of the embossed surface (Spd value), which is evaluated by ISO_25178, is 200 or more and 1500 or less, and wherein a sum of maximum peak height and maximum valley depth of the embossed surface (Sz value) is 30 to 90 μm.

13 Claims, No Drawings

LAMINATING FILM AND LIGHT-TRANSMITTING LAMINATE INCLUDING SAME

CROSS-REFERENCE TO RELATED APPLICATIONS

Pursuant to 35 USC 120 and 365(c), this application is a continuation of International Application No. PCT/KR2020/016236 filed on Nov. 18, 2020, and claims the benefit under 35 USC 119(a) of Korean Application No. 10-2019-0151930 filed on Nov. 25, 2019 in the Korean Intellectual Property Office, the entire disclosures of which are incorporated herein by reference for all purposes.

BACKGROUND

1. Field

The present disclosure relates to a film for laminating and a light transmitting laminate including the same.

2. Description of the Background

Polyvinyl acetal is being used as an interlayer (film for laminated glass) of a laminated glass (safety glass) or a light transmitting laminate. Laminated glass is mainly used in windows of architecture, cladding, and window glass of automobiles. Due to characteristics such as anti-scattering of glass fragments and penetration resistance against impact of a certain strength, laminated glass can secure stability for minimizing damage or injury given to objects or people located inside the architecture or the automobiles.

A film for laminating has plural minute embossments formed on its surface to improve workability such as preventing blocking among interlayers, overlapping a glass plate with an interlayer (sliding property from a glass plate as handling workability), and deairing a film when processed to be laminated with a glass plate.

When a film for laminating, in which embossments are formed, is used for lamination, there is a possibility of generating an interference fringe or a bubble due to the embossments placed on both surfaces of the film, and visibility may be made. Also, there is a problem of degrading workability when a dazzle occurs on the surface of a film for laminating.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a film for laminating includes an embossed surface, wherein a rad value of the embossed surface is 1 to 3 μm, where the rad value is calculated by [Formula 1] below:

$$\text{rad(um)} = \frac{1000}{Spc(\text{mm}^{-1})} \quad [Formula\,1]$$

where, in [Formula 1], Spc is an arithmetic mean of curvatures of peak vertex on the embossed surface, which is evaluated by ISO_25178.

A number of peaks per 1 mm² of the embossed surface (Spd value), which is evaluated by ISO_25178, may be 200 or more.

The rad value of the embossed surface may be 1.5 to 3 μm.

The Spd value of the embossed surface may be 1500 or less.

A sum of maximum peak height and maximum valley depth of the embossed surface (Sz value) may be 30 to 90 μm.

The film for laminating may include a minute pattern on the embossed surface.

The film for laminating may have a variance of vacuum degree of 0 to 40 mmHg, when after light transmitting bodies are laminated on both surfaces thereof, vacuumizing is performed at room temperature, and a temperature of the film for laminating is raised by 10° C.

The film for laminating may be a single layer film or a laminated film of two layers or more.

The film for laminating may include a polyvinyl acetal resin.

The film for laminating may include a wedge shape in at least some or all of a cross-section thereof.

In another general aspect, a light transmitting laminate includes a first light transmitting layer, a film for laminating disposed on one surface of the first light transmitting layer, and a second light transmitting layer disposed on the film for laminating, wherein the film for laminating includes an embossed surface, wherein a rad value of the embossed surface is 1 to 3 μm, where the rad value is calculated by [Formula 1] below:

$$\text{rad(um)} = \frac{1000}{Spc(\text{mm}^{-1})} \quad [Formula\,1]$$

where, in [Formula 1], Spc is an arithmetic mean of curvatures of peak vertex on the embossed surface, which is evaluated by ISO_25178.

A number of peaks per 1 mm² of the embossed surface (Spd value), which is evaluated by ISO_25178, may be 200 or more.

The rad value of the embossed surface may be 1.5 to 3 μm.

The Spd value of the embossed surface may be 1500 or less.

A sum of maximum peak height and maximum valley depth of the embossed surface (Sz value) may be 30 to 90 μm.

The film for laminating may include a minute pattern on the embossed surface.

The film for laminating may be a single layer film or a laminated film of two layers or more.

The film for laminating may include a polyvinyl acetal resin.

The film for laminating may include a wedge shape in at least some or all of a cross-section thereof.

In still another general aspect, a vehicle includes the light transmitting laminate as a wind shield.

Other features and aspects will be apparent from the following detailed description and the claims.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

In this disclosure, the term for degree like "about", "substantially" and the like is used for meaning values approximative from/to the value when a tolerance to be proper to referred meaning for manufacture and substance is presented. Additionally, these terms for degree are used to help understanding of example embodiments and to prevent that an unconscionable trespasser unjustly uses the presented content in which exact or absolute number is referred.

Throughout this disclosure, the phrase "combination(s) thereof" included in a Markush-type expression denotes one or more mixtures or combinations selected from the group consisting of components stated in the Markush-type expression, that is, denotes one or more components selected from the group consisting of the components are included.

Throughout this disclosure, the description of "A and/or B" means "A, B, or A and B."

Throughout this disclosure, terms such as "first", "second", "A", or "B" are used to distinguish the same terms from each other unless specially stated otherwise.

In this disclosure, "B being placed on A" means that B is placed in direct contact with A or placed over A with another layer or structure interposed therebetween and thus should not be interpreted as being limited to B being placed in direct contact with A.

In this disclosure, a singular form is contextually interpreted as including a plural form as well as a singular form unless specially stated otherwise.

In the present disclosure, embossments are unevenness present on a surface of a film for laminating, and means a wave obtained by measuring a sectional curve of a film for laminating, and removing small scale lateral components, that are minute unevenness components from the curve, with using a S-filter defined by ISO 25178-2:2012DML PART2.

A convex portion of embossments is referred to as a peak, and a concave portion of embossments is referred to as a valley. A width of the valley refers to a width of the valley in a virtual surface extended from the peak when a film for laminating and a light transmitting laminate are laminated.

In the present disclosure, the amount of a hydroxyl group was evaluated by measuring an amount of ethylene group combined with the hydroxyl group of the polyvinyl acetal resin by a method in accordance with JIS K6728.

In the present disclosure, room temperature is 20 to 25° C., and specifically 25° C.

Spd (number of peaks per unit area), Spc (arithmetic mean of the principal curvatures of peaks within a definition area), and Sz (Ten point height of irregularities) values are values evaluated according to ISO_25178, and measurable by a 3D roughness meter.

The Spd value is a value evaluated according to ISO_25178. The Spd value means a number of peaks per unit area.

The Spc value is a value evaluated according to ISO_25178. The Spc value means arithmetic mean of the curvatures of peak vertex on a surface.

The Sz value is a value evaluated according to ISO_25178. The Sz value means a sum of the maximum peak height value and the maximum valley depth value, and means a height difference value between the height of the peak and the height of the valley.

An objective of the present disclosure is to provide a film for laminating, which has stable de-airing property and edge sealing property when being laminated in a wide temperature range, and a light transmitting laminate including the same.

The film for laminating and the light transmitting laminate including the same of example embodiments control the characteristics of the embossed surface and thereby can provide a film for laminating and the like having stable de-airing performance and edge sealing performance.

A film for laminating may have surface embossment characteristics such as a regular unevenness pattern or a melt fracture on a surface thereof, to prevent unnecessary blocking when being winded and to achieve de-airing property when being laminated with a light transmitting laminate such as a glass plate. However, in a process for controlling surface embossment characteristics, if only de-airing property of the film for laminating is emphasized, optical properties of the film for laminating may be degraded or an edge sealing characteristic may be deficient, and if the edge sealing characteristic and the like are emphasized, optical properties may be degraded instead due to problems such as an occurrence of bubbles or the like.

A pre-laminating process may ordinarily proceed at a lower temperature than that of a main laminating. In the pre-laminating process, when a nip roll is used, an actual temperature of glass is relatively lower than when a vacuum ring is used. Ordinarily, main laminating process proceeds at 130 to 150° C. based on the temperature of a glass surface, and pre-laminating process proceeds at about 100 to 110° C. when using a vacuum ring and proceeds at about 70° C. or less when using a nip roll.

When pre-laminating is performed at a low temperature, simply lowering roughness of an embossment pattern is a conventional method to obtain a stable bonding performance, but it may cause degradation of de-airing property.

Inventors of the present disclosure verified that, when surface characteristics of an embossed surface was controlled, complementary characteristics such as de-airing property and edge sealing property could be satisfied at the same time and completed example embodiments.

For solving the above objective, the film for laminating according to one embodiment disclosed in the present disclosure includes an embossed surface. A rad value is expressed by below Formula 1 and a rad value of the embossed surface is 1 to 3 μm:

$$\text{rad}(\text{um}) = \frac{1000}{Spc(\text{mm}^{-1})} \quad [Formula\ 1]$$

The rad is a parameter obtained from Spc, which is a parameter for arithmetical mean of the curvature of peak vertex. The rad value is obtained from Formula 1 as described above.

A Spd value of the embossed surface may be 200 mm$^{-2}$ or more.

The Spc and the Spd values are evaluated according to ISO_25178. A measured and calculated value of the Spc and the Spd values may be obtained by using a three-dimensional roughness meter.

A measurement of 3D roughness may be evaluated by an average of values measured in a total area of 1,000,000 μm$^2$ or more. In detail, when measured by using a three-dimensional optical profiler or a 3D laser measuring microscope, the 3D roughness may be measured five times or more at positions different from one another, respectively, wherein each area has a size of 340 thousand μm$^2$ or more, respectively, and an average of the values except for the maximum and the minimum may be adopted as a measuring value for three-dimensional roughness. When using a 3D laser measuring microscope, 3D roughness can be measured by utilizing STICHING function to join images at neighboring positions from one another. The measurement of 3D roughness utilizing this STICHING function can also be evaluated by an average of the values measured in a total area of 1,000,000 μm$^2$ or more.

For example, OLS 5000 model of 3D Optical Microscopy may be used to measure and to obtain 3D roughness. After measuring image using the roughness meter, correction of image is performed by conventional GAUSSIAN filter, and small scale lateral components are removed by S-filter to measure Spc and Spd values.

Ordinarily, when S-filter of 8 μm cut off is applied, scale lateral components with a width of less than 2 μm are removed, and when W-filter of 50 μm cut off is applied, scale lateral components with a width of less than 12 μm are removed.

The film for laminating may include an embossment pattern on the surface to have stable de-airing performance when laminated with a light transmitting laminate. The embossment pattern may be formed by treating the surface of the film for laminating with a transferring process. The transferring process may be performed by using an embossment mold or roller, but is not limited thereto.

Surface characteristics of the film for laminating may be different depending on the curvature of the peak, which is a convex portion of embossments. When the film for laminating is laminated with a light transmitting laminate, as the curvature of the peak is smaller, an area contacting with a light transmitting laminate per one peak may be smaller, and as the curvature of a peak is larger, the area contacting with a light transmitting laminate per one peak may be larger.

When the curvature of the peak is controlled within a proper range, a surface profile of the film for laminating is properly regulated and the film for laminating may have stable edge sealing property and de-airing property. In detail, when the curvature of the peak is regulated, the area contacting with a light transmitting laminate per one peak may be regulated. Through this, the width of a valley, which emits residual air between a light transmitting laminate and the film for laminating is controlled and the film for laminating may have stable de-airing property. Also, when the width of the valley is regulated, the embossment pattern may be smoothly collapsed upon pre-laminating and main laminating, and the film for laminating may have excellent edge sealing property.

The film for laminating includes an embossed surface, and the embossed surface may have a rad value of 1 μm or more. The rad value may be 1.2 μm or more. The rad value may be 1.5 μm or more. The rad value may be 3 μm or less. The rad value may be 2.8 μm or less. In such a case, the film for laminating may have stable edge sealing property and excellent de-airing characteristic.

Also, a Spd value of the embossed surface of the film for laminating may be regulated. When the Spd value of the embossed surface is regulated, the width of the valley on the surface of the film for laminating is regulated and the film for laminating may have stable edge sealing property and de-airing property.

The Spd value may be 200 mm$^{-2}$ or more. The Spd value may be 300 mm$^{-2}$ or more. The Spd value may be 400 mm$^{-2}$ or more. The Spd value may be 1500 mm$^{-2}$ or less. The Spd value may be 1400 mm$^{-2}$ or less. The Spd value may be 1300 mm$^{-2}$ or less. In such a case, the film for laminating may have stable edge sealing property and de-airing characteristic.

The film for laminating can be simultaneously regulated for the rad value and the Spd value of the embossed surface. Even though the rad value of the embossed surface is regulated, when the Spd value is not regulated, the width of a valley on the surface of the film for laminating may not be properly regulated and there may be problems in edge sealing property and de-airing property of the film for laminating. In detail, if a number of embossments per unit area is smaller, the width of a valley may be larger, and if the number of embossments per unit area is larger, the width of a valley may be smaller. Thus, if the rad and the Spd values of the embossed surface are simultaneously regulated, the film for laminating may have excellent edge sealing property and de-airing property when laminated A Sz value of the embossed surface may be 30 to 90 μm.

The Sz value may be evaluated according to ISO_25178.

A measured and calculated value of Sz value may be obtained by using three-dimensional roughness meter. For example, 3D roughness may be measured by using a non-contact type three-dimensional roughness meter (model OLS 5000) available from OLYMPUS. A measured image is corrected with conventional GAUSSIAN filter, noise is removed under a condition of S filter 50 μm, and after that, the Sz value is measured.

The Sz value of the embossed surface may be 30 μm or more. The Sz value may be 40 μm or more. The Sz value may be 45 μm or more. The Sz value may be 90 μm or less. The Sz value may be 80 μm or less. The Sz value may be 75 μm or less. The film for laminating having such surface embossment characteristics may have stable de-airing property.

The film for laminating may have a minute pattern on the embossed surface. The minute pattern refers to a pattern including unevenness with a height of 2 to 10 μm.

The minute pattern may be formed on a peak of the embossment pattern, and may be formed on the valley of the embossment pattern.

In a process for forming embossments, a method of additionally forming a minute pattern on one surface of the film for laminating or additionally forming a minute pattern on a surface of a mold or a roller for transferring embossments may be applied. In such a case, the embossed surface may have characteristics described above.

In detail, a minute pattern is additionally formed on the surface of a mold or a roller for transferring embossments on the surface of the film for laminating, and a pattern is transferred on the surface of the film for laminating by using the mold or the roller, thereby allowing the film for laminating to include the minute pattern. For example, minute sand blast treatment may be performed on the surface of the mold or the roller, and the mold or the roller may additionally have a minute pattern on the surface thereof. However, a processing method for additionally forming a minute pattern on the surface of a mold or a roller is not limited thereto.

The film for laminating may have a variance of vacuum degree of 0 to 40 mmHg when light transmitting bodies are laminated to both surfaces thereof, vacuumized at room temperature, and then, the temperature of the film for laminating is raised by 10° C.

A detailed method for measuring the variance of vacuum degree of the film for laminating is described below in experimental examples, and thus further description is omitted.

In a case of a film for laminating with excellent de-airing property, when the film is laminated with a light transmitting body and is vacuumized, an air between the light transmitting body and the film for laminating may be sufficiently emitted, thus a residual air may not exist in a substantial amount or exist in a trace amount. Due to this, a light transmitting laminate with clearer and excellent optical properties may be obtained after main laminating. Accordingly, when a temperature is raised after vacuumizing, a film for laminating with excellent de-airing property may have a pattern, which may be rapidly collapsed on the surface of the film for laminating. At this time, the amount of air emitted may be slight and the variance of vacuum degree may be small.

The variance of vacuum degree of the film for laminating may be 0 mmHg or more. The variance of vacuum degree may be 5 mmHg or more. The variance of vacuum degree may be 7 mmHg or more. The variance of vacuum degree may be 40 mmHg or less. The variance of vacuum degree may be 25 mmHg or less. The variance of vacuum degree may be 10 mmHg or less. In such a case, the film for laminating may have a comparatively stable de-airing property even during a laminating process at a low temperature.

The film for laminating may be a single layer film or a multilayer film.

When the film for laminating is a single layer film, the film for laminating may include an adhesive layer.

Hereinafter, the composition of the film for laminating or the like will be described.

The film for laminating may include a polyvinyl acetal resin, or may include a polyvinyl acetal resin and a plasticizer.

In detail, the film for laminating may include the polyvinyl acetal resin in an amount of 60 wt % to 76 wt %. The film for laminating may include the polyvinyl acetal resin in an amount of 70 wt % to 76 wt %. The film for laminating may include the polyvinyl acetal resin in an amount of 71 wt % to 74 wt %. When including the polyvinyl acetal resin in such range, the film for laminating may have comparatively high tensile strength and modulus.

The polyvinyl acetal resin may include an acetyl group in an amount of less than 2 wt %. The polyvinyl acetal resin may include the acetyl group in an amount of 0.01 or more and less than 1.5 wt %. The polyvinyl acetal resin may include a hydroxyl group in an amount of 15 wt % or more. The polyvinyl acetal resin may include the hydroxyl group in an amount of 16 wt % or more. The polyvinyl acetal resin may include the hydroxyl group in an amount of 19 wt % or more. Also, the polyvinyl acetal resin may include the hydroxyl group in an amount of 30 wt % or less. When the polyvinyl acetal resin having such characteristics is applied to the film for laminating, the film for laminating may have mechanical properties such as proper penetration resistance, while being excellently laminated with a material such as glass.

The polyvinyl acetal resin may be a polyvinyl acetal resin obtained by acetalization of a polyvinyl alcohol having a polymerization degree of 1,600 to 3,000 with aldehyde, or may be a polyvinyl acetal resin obtained by acetalization of a polyvinyl alcohol having a polymerization degree of 1,700 to 2,500 with aldehyde. When such a polyvinyl acetal is applied, mechanical properties such as penetration resistance may be sufficiently improved.

The polyvinyl acetal resin may be one synthesized from polyvinyl alcohol and aldehyde, and the aldehyde is not limited in type. In detail, the aldehyde may be any one selected from the group consisting of n-butyl aldehyde, isobutyl aldehyde, n-valer aldehyde, 2-ethyl butyl aldehyde, n-hexyl aldehyde, and blend resins thereof. When n-butyl aldehyde is applied as the aldehyde, the resulting polyvinyl acetal resin may have a characteristic in refractive index with little difference from glass, and a characteristic in excellent adhesion with glass and the like.

The film for laminating may include a plasticizer in an amount of 24 to 40 wt %. The film for laminating may include the plasticizer in an amount of 24 to 30 wt %. The film for laminating may include the plasticizer in an amount of 26 to 29 wt %. A case including the plasticizer in such a range is preferable in that the laminated film for laminating may achieve proper adhesive strength and impact resistance.

In detail, the plasticizer may be any one selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA) and combinations thereof. Specifically, any one selected from the group consisting of triethylene glycol di-2-ethyl butyrate, triethylene glycol di-2-ethylhexanoate, triethylene glycol di-n-heptanoate, and combinations thereof may be included as the plasticizer, and further specifically, triethylene glycol bis 2-ethylhexanoate (3G8) may be applied.

The film for laminating may further include an additive as needed, and for example, the additive may be any one selected from the group consisting of an antioxidant, a heat stabilizer, a UV absorber, a UV stabilizer, an IR absorber, a glass adhesion regulator, and combinations thereof.

As the antioxidant, a hindered amine-based antioxidant or a hindered phenol-based antioxidant may be used. Specifically, during the process of manufacturing polyvinyl butyral (PVB), which needs a processing temperature of 150° C. or higher, a hindered phenol-based antioxidant is further preferable. The hindered phenol-based antioxidant may be, for example, IRGANOX 1076, 1010, or so available from BASF SE.

As the heat stabilizer, a phosphite-based heat stabilizer may be used considering suitability with an antioxidant. For example, the heat stabilizer may be IRGAFOS 168 available from BASF SE.

As the UV absorber, Chemisorb 12, Chemisorb 79, Chemisorb 74, or Chemisorb 102 available from CHEMIPRO KASEI KAISHA, LTD may be used, or Tinuvin 328, Tinuvin 329, or Tinuvin 326 available from BASF SE may be used. As the UV stabilizer, Tinuvin available from BASF SE may be used. As the IR absorber, ITO, ATO, or AZO may be used, and as the glass adhesion regulator, a metal salt such as magnesium (Mg), potassium (K), sodium (Na), epoxy-based modified silicon (Si) oil, or a mixture thereof may be used, but the present disclosure is not limited thereto.

The film for laminating may be a multilayer film. The film for laminating may be a laminate with two or more layers, a laminate with three or more layers, or a laminate with five or more layers. The multilayer film may include an adhesive layer disposed in direct contact with a light transmitting laminate such as a glass plate and a core layer distinct from the adhesive layer. The core layer may include functionality, and for example, may have functionality such as heat insulating functionality.

The multilayer film may have at least one layer including the polyvinyl acetal resin corresponding to the composition of the single layer described above, or including the polyvinyl acetal resin and a plasticizer. Descriptions of the polyvinyl acetal resin and the plasticizer are overlapped with the above description and thus the further description is omitted.

The film for laminating may include a sound insulating layer. The sound insulating layer may be disposed between adhesive layers, or may be disposed on one surface of an adhesive layer.

The sound insulating layer may include a polyvinyl acetal resin.

The sound insulating layer may include a polyvinyl acetal resin in an amount of 54 wt % or more. The sound insulating layer may include a polyvinyl acetal resin in an amount of 76 wt % or less. The sound insulating layer may include a polyvinyl acetal resin in an amount of 60 wt % or more. The sound insulating layer may include a polyvinyl acetal resin in an amount of 70 wt % or less.

The sound insulating layer may include a plasticizer in an amount of 24 wt % or more. The sound insulating layer may include a plasticizer in an amount of 46 wt % or less. The sound insulating layer may include a plasticizer in an amount of 30 wt % or more. The sound insulating layer may include a plasticizer in an amount of 40 wt % or less.

A polyvinyl acetal resin included in the sound insulating layer may include an acetyl group in an amount of 8 mol % or more. The polyvinyl acetal resin may include an acetal group of 8 mol % to 30 mol %. Also, a polyvinyl acetal resin included in the sound insulating layer may include a hydroxyl group in an amount of 26 mol % or less. The polyvinyl acetal resin may include a hydroxyl group in an amount of 10 wt % to 25 wt %. In such a case, it is possible to give more stable sound insulating characteristic to the film for laminating.

The film for laminating may be manufactured to be a sheet form by extruding the composition for manufacturing the film for laminating including a resin and a plasticizer, and an additive as needed, and shaping it through a T-DIE or the like. When the film for laminating is a multilayer film, a laminating mean such as a feed block may be further applied to the front of the T-DIE.

The film for laminating manufactured into a sheet form may be manufactured by processes such as controlling the thickness of the film and forming embossments on the surface thereof to obtain the film for laminating, but the manufacturing method for the film for laminating in embodiments is not limited thereto.

A single layer film or a multilayer film is manufactured by forming surface embossments on the film using an embossment mold or roller to obtain the film in a sheet form as the same method described above.

The surface characteristics of the embossment mold or roller may be transferred to the surface of a single layer film for a multilayer film through a method of heating and pressurizing, which is ordinarily applied to a film for laminating. Accordingly, the characteristics of the embossed surface may be controlled by controlling the surface characteristics of the embossment mold or roller.

The embossment mold or roller may be manufactured by a method such as grit blast treatment on a surface of basic mold or roller. In this time, the condition (sizes of particles, a pressure of injection, a distance of injection, an angle of injection, and the like) applied to grit blast treatment may be adjusted to control the surface characteristics of the mold or the roller, and this influences the embossment characteristics of the film surface, complementarily.

For example, particles with an average diameter of 5 μm may be injected to concave portions of a basic roller, which has an Rz roughness value of 30 to 90 μm and unevenness in a matte pattern shape where dots are randomly formed, using a direct air blast system at a distance of 30 cm to 40 cm, with an injecting pressure of 0.2 MPa, and with an angle of the nozzle of 75 to 105°, thereby performing grit blast treatment one to ten times. Through the grit blast treatment, a minute pattern may be formed on the surface of the film, complementarily, and thereby the surface characteristics of the film may be controlled. Through this, the edge sealing property and de-airing property of the film for laminating may be improved more.

The light transmitting laminate according to another embodiment disclosed in the present disclosure includes a first light transmitting layer, a film for laminating disposed on one surface of the first light transmitting layer, and a second light transmitting layer disposed on the film for laminating.

The first light transmitting layer and the second light transmitting layer may be independently a light transmitting glass, or a light transmitting plastic, respectively.

The film for laminating is the film for laminating described in the above, and the detailed description thereof is overlapped with the above description, and thus further description is omitted.

The vehicle according to another embodiment disclosed in the present disclosure includes the light transmitting laminate described above. The vehicle includes a body forming a main body of the vehicle, a driver (engine, etc.) attached to the body, a drive wheel rotatably attached to the body, a connector connecting the drive wheel and the driver; and a windshield attached to a part of the body, which is the light transmitting laminate for blocking wind from outside.

Hereinafter, detailed embodiments will be described in further detail. In below descriptions of experiments, a case where % is described without clarity whether the unit is wt % or mol %, refers to wt %.

Manufacturing Example: Processing of Mold

Manufacture of Pattern Mold not Applying Additive Processing of Minute Pattern

Pattern molds (MOLD #1) of 50 cm×50 cm, having a pattern, in which matte patterned embossments in a dot type shape are arranged randomly, on a surface of a steel plate were produced.

Manufacture of Pattern Mold with Additive Processing of Minute Pattern

Grit blast treatment was added to the surface of the pattern mold (MOLD #1) and thereby pattern molds (MOLD #2a, MOLD #2b, and MOLD #2c) were manufactured, respectively. In detail, the grit blast treatment was performed by injecting particles having an average outside diameter of 5 μm at a distance of 30 to 40 cm and with an injection pressure of 0.2 MPa using a direct air blast system. An angle between the surface of the mold and injected particles (or a nozzle) was 75 to 105°.

The pattern mold (MOLD #2) was treated by the above grit blast treatment one time. The pattern mold (MOLD #2b) was treated by the above grit blast treatment three times. The pattern mold (MOLD #2c) was treated by the above grit blast treatment ten times.

The molds manufactured in this manner were applied to Examples or Comparative Example as indicated in Table 1 below.

Manufacturing Example: Manufacture of Film

Manufacture of Resin Composition and Additive

Respective ingredients used in Examples and Comparative Example below are as follows.

Polyvinyl Butyral Resin (A): PVA having a polymerization degree of 1700 and a saponification degree of 99 and n-BAL were added to perform a conventional synthesizing process, and thereby a polyvinyl butyral resin having a hydroxyl group of 20.3 wt %, a butyral group of 78.9 wt %, and an acetyl group of 0.8 wt % was obtained.

Manufacture of Additive: Irganox 1076 as an antioxidant of 0.1 parts by weight, TINUVIN-328 as a UV absorber of 0.2 parts by weight, Mg Acetate as an adhesion regulator of 0.03 parts by weight were blended and mixed in a tumbler to be sufficiently dispersed (A total amount of 0.33 parts by weight).

Manufacture of Sheet

The polyvinyl butyral resin (A) of 72.67 wt %, 3g8 as a plasticizer of 27 wt % and an additive of 0.33 wt % were added to one twin-screw extruder and manufactured into a sheet of a mirror surface. The manufactured sheet had a thickness of 760 μm and a width of 1.0 M.

Manufacture of Samples

Comparative Example 1: The manufactured sheet was cut into a sheet of 350 mm×350 mm from the center of a width direction. Total of three sheets were cut along a length direction of the sheet by the same method. A pattern mold (MOLD #1) was disposed on both surfaces of the cut sheet, and patterning thereof was performed for 10 minutes by using a laminator at 120° C. and a pressure of 1 atm. The sheet after patterning was placed in a cooler at −10° C. for quenching and separated from the mold, and the sample was obtained.

Example 1: While manufactured under the same condition as the manufacturing method of Comparative Example 1, Example 1 was manufactured by applying MOLD #2a as a pattern mold.

Example 2: While manufactured under the same condition as the manufacturing method of Comparative Example 1, Example 2 was manufactured by applying MOLD #2b as a pattern mold.

Example 3: While manufactured under the same condition as the manufacturing method of Comparative Example 1, Example 3 was manufactured by applying MOLD #2c as a pattern mold.

Evaluating Example: Evaluation of Properties

Measurement of 3D Roughness 3D roughness was measured through a measuring device, and Spc, Spd, and Sz values were obtained from the film surface according to ISO_25178, respectively. In detail, 3D roughness was measured by using a non-contact type three-dimensional roughness meter available from OLYMPUS (model OLS 5000), and the above values were obtained.

The roughness values were measured by applying an 1×ocular lens and 50×objective lens. At this time, the area with a width of 597.5 μm and a length of 523.5 μm was scanned per one image. The measuring area was designated randomly from the same pattern, and four in a width direction and four in a length direction, as total sixteen images were repetitively measured. After that, stitching thereof was performed and thereby an image in a size with a width of 2390.2 μm and a length of 2381.2 μm was measured. The measured image was corrected by conventional GAUSSIAN filter, and noise was removed under a condition of S filter 50 μm. An average of values except for the maximum and the minimum measured from data, from which noise was removed, was adopted as a three-dimensional roughness measuring value, and results were shown in Table 1 below.

Evaluation of De-airing Property After Pre-laminating

The manufactured samples of Examples and Comparative Example were cut into a form of a circle glass plate shape with a diameter of 300 mm and laminated between circle shaped glass plates, and a vacuum ring was set thereto. Thereafter, the samples were vacuumized by using a vacuum pump at room temperature. After the vacuumizing, the temperature was raised by 10° C., and the variance of vacuum degree of sample films laminated between circle shaped glass plates was measured. After the sample films were vacuumized and the temperature was raised by 10° C., when the measured variance of vacuum degree was more than 40 mmHg, it was expressed as Fail, when the variance of vacuum degree was 40 mmHg or less, it was expressed as Pass, and the result was shown in Table 2 below.

Evaluation of Edge Sealing

Manufacture of Samples for Evaluation) Samples of Examples and Comparative Example were cut into width*length of 300*300 mm, after that, the cut samples were placed between two pieces of plate glass with a thickness of 2.1 T (T=mm) to be pre-laminated, and respective three samples for evaluation of Examples and Comparative Example were manufactured.

Each sample for evaluation had width*length of 300*300 mm, thus a total length of four edges is 1200 mm. Three samples for evaluation of each of Examples and Comparative Example were prepared, and edge sealing thereof was evaluated in total 3.6 m.

Pre-laminating process was performed by de-airing using a vacuum ring for 5 minutes at 20° C. and maintaining at two other temperature zones of 70° C. and 100° C. for 15 minutes.

Evaluation for Edge Sealing Property) The samples for evaluation were evaluated by naked eyes. When a sample had perfect edge sealing and a pattern does not appear, it was evaluated as 5 points. When a sample had good edge sealing degree and a pattern weakly identified by naked eyes, it was evaluated as 4 points. When a sample had normal edge sealing degree and a pattern identified by naked eyes, it was evaluated as 3 points. When a sample had bad edge sealing degree and a pattern identified by naked eyes, it was evaluated as 2 points. And when a sample had bad edge sealing degree and a pattern strongly identified by naked eyes, it was evaluated as 1 point. Total points of scores of respective three samples were shown in Table 2.

Evaluation for Bubble Occurrence After Main Laminating

The samples for evaluation of Examples and Comparative Example after being pre-laminated were pressurized inside an autoclave for 20 minutes under the condition of 140° C. and 1.2 MPa and laminated glass after main laminating was obtained. The time for the main laminating including a time for raising a temperature and a time for lowering a temperature was 90 minutes in total.

A number of bubbles occurring on laminated glass after main laminating was checked by naked eyes. When the sum of bubble numbers checked in respective three samples of Examples and Comparative Example was 5 or less, it was expressed as 5 points. When the sum of bubble numbers was 6 to 10, it was expressed as 3 points. And when the sum of bubble numbers was 11 or more, it was expressed as 1 point to be shown in Table 2.

TABLE 1

| | Used Mold | The Result of Measuring Surface Roughness | | | |
|---|---|---|---|---|---|
| | | Sz (μm) | Spd (mm$^{-2}$) | Spc (mm$^{-1}$) | Rad (μm) |
| Comparative Example 1 | MOLD#1 | 49.1 | 291.3 | 187.5 | 5.3 |
| Example 1 | MOLD#2a | 47.8 | 575.3 | 419.9 | 2.4 |
| Example 2 | MOLD#2b | 47.0 | 677.3 | 422.1 | 2.4 |
| Example 3 | MOLD#2c | 42.1 | 1149.8 | 513.6 | 1.9 |

TABLE 2

| | Evaluation for Edge Sealing | | Evaluation for De-airing | Evaluation for Bubble |
|---|---|---|---|---|
| | Temperature of Pre-laminating | Property of Pre-laminating | Property After Pre-laminating | Occurrence After Main Laminating |
| Comparative Example 1 | 100° C. | 15 points | Pass | 3 points |
| | 70° C. | 12 points | Fail | 3 points |
| Example 1 | 100° C. | 15 points | Pass | 5 points |
| | 70° C. | 13 points | Pass | 5 points |
| Example 2 | 100° C. | 15 points | Pass | 5 points |
| | 70° C. | 15 points | Pass | 5 points |
| Example 3 | 100° C. | 15 points | Pass | 5 points |
| | 70° C. | 15 points | Pass | 5 points |

Referring to Table 1 above, when Sz values of Examples and Comparative Example are compared, the difference value is only 7 μm at maximum. This means Sz value is not largely varied even though an embossment pattern, in which a minute pattern is additionally processed, is transferred to the surface of the film for laminating.

For Spd value, Comparative Example was measured to have a Spd value of 300 mm$^{-2}$ or less, but Examples 1 to 3 were measured to have respective Spd values of 500 mm$^{-2}$ or more, wherein Example 2 had a larger value of Spd than Example 1, and Example 3 had a larger value than Example 2. This means when an embossment pattern, in which a minute pattern is additionally formed, is transferred to the surface of the film for laminating, Spd value of the film for laminating increases. And this means that as the number of grit blast treated on the surface of the pattern mold is increased, Spd value of the film for laminating increases.

For rad value, Comparative Example was measured to have a rad value of 5 μm or more, but Examples 1 to 3 were measured to have a rad value of 2.5 μm or less. This means that, when an embossment pattern, in which a minute pattern is additionally formed, is transferred to the surface of the film for laminating, the rad value decreases.

Referring to Table 2, Comparative Example 1 was measured to have an evaluated score of 12 points in an evaluation of edge sealing when pre-laminated at 70° C., but in cases of Examples 1 to 3, Example 1 was measured to have an evaluated score of 13 points when pre-laminated at 70° C., and the Examples under all other conditions were measured as 15 points. This means that, when an embossment pattern, in which a minute pattern is additionally formed, is transferred to the surface of the film for laminating and thereby the characteristics of the embossed surface of the film for laminating are regulated, the film for laminating can have excellent adhesive strength and can have stable edge sealing performance when particularly pre-laminated at a low temperature.

For evaluation of de-airing property after pre-laminating, Comparative Example 1 was evaluated as Fail when pre-laminated at 70° C., but Examples 1 to 3 were evaluated as Pass under all conditions. This means that, when the embossed surface characteristics of the film for laminating is regulated by transferring an embossment pattern, in which a minute pattern is additionally formed, to the surface of a film for laminating, the film for laminating can have excellent de-airing property in a wide temperature range when pre-laminated.

For the evaluation of bubble occurrence after main-laminating, Comparative Example 1 was evaluated as 3 points under all conditions, but Examples 1 to 3 were evaluated as 5 points under all conditions. This means that, when the embossed surface characteristics of the film for laminating is regulated by transferring an embossment pattern, in which a minute pattern is additionally formed, to the surface of a film for laminating, the film for laminating can have stable de-airing property during pre-lamination and main lamination.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A film for laminating comprising an embossed surface, wherein a rad value of the embossed surface is 1 to 3 μm, where the rad value is calculated by [Formula 1] below:

$$\text{rad}(um) = \frac{1000}{Spc(\text{mm}^{-1})} \quad [Formula\ 1]$$

where, in [Formula 1], Spc is an arithmetic mean of curvatures of peak vertex on the embossed surface, which is evaluated by ISO_25178,
wherein a number of peaks per 1 mm² of the embossed surface (Spd value), which is evaluated by ISO_25178, is 200 or more and 1500 or less, and
wherein a sum of maximum peak height and maximum valley depth of the embossed surface (Sz value) is 30 to 90 μm.

2. The film for laminating of claim 1, wherein the rad value of the embossed surface is 1.5 to 3 μm.

3. The film for laminating of claim 1, wherein the film for laminating has a variance of vacuum degree of 0 to 40 mmHg, when after light transmitting bodies are laminated on both surfaces thereof, vacuumizing is performed at room temperature, and a temperature of the film for laminating is raised by 10° C.

4. The film for laminating of claim 1, wherein the film for laminating is a single layer film or a laminated film of two layers or more.

5. The film for laminating of claim 1, wherein the film for laminating comprises a polyvinyl acetal resin.

6. The film for laminating of claim 1, wherein the film for laminating comprises a wedge shape in at least some or all of a cross-section thereof.

7. A light transmitting laminate comprising:
a first light transmitting layer;
a film for laminating disposed on one surface of the first light transmitting layer; and
a second light transmitting layer disposed on the film for laminating,
wherein the film for laminating comprises an embossed surface, wherein a rad value of the embossed surface is 1 to 3 μm, where the rad value is calculated by [Formula 1] below:

$$\text{rad}(um) = \frac{1000}{Spc(\text{mm}^{-1})} \quad [Formula\ 1]$$

where, in [Formula 1], Spc is an arithmetic mean of curvatures of peak vertex on the embossed surface, which is evaluated by ISO_25178,
wherein a number of peaks per 1 mm² of the embossed surface (Spd value), which is evaluated by ISO_25178, is 200 or more and 1500 or less, and
wherein a sum of maximum peak height and maximum valley depth of the embossed surface (Sz value) is 30 to 90 μm.

8. The light transmitting laminate of claim 7, wherein the rad value of the embossed surface is 1.5 to 3 μm.

9. The light transmitting laminate of claim 7, wherein a sum of maximum peak height and maximum valley depth of the embossed surface (Sz value) is 30 to 90 μm.

10. The light transmitting laminate of claim 7, wherein the film for laminating is a single layer film or a laminated film of two layers or more.

11. The light transmitting laminate of claim 7, wherein the film for laminating comprises a polyvinyl acetal resin.

12. The light transmitting laminate of claim 7, wherein the film for laminating comprises a wedge shape in at least some or all of a cross-section thereof.

13. A vehicle comprising the light transmitting laminate of claim 7 as a wind shield.

\* \* \* \* \*